United States Patent [19]

Kontsch et al.

[11] 4,099,746

[45] Jul. 11, 1978

[54] EQUALIZING ARRANGEMENT FOR A LOW TEMPERATURE LINE

[75] Inventors: Otmar Kontsch, Sankt Stefan, Austria; Fritz Schmidt, Erlangen, Germany

[73] Assignee: Siemens Aktiengesellschaft, Munich, Germany

[21] Appl. No.: 721,486

[22] Filed: Sep. 8, 1976

[30] Foreign Application Priority Data

Sep. 16, 1975 [DE] Fed. Rep. of Germany ....... 2541219

[51] Int. Cl.² ............................................. F16L 51/02
[52] U.S. Cl. ................................... 285/119; 285/138; 285/187; 285/226; 285/DIG. 5; 285/DIG. 6
[58] Field of Search ............. 285/47, 114, 119, 133 R, 285/138, 187, 226, DIG. 5, DIG. 6; 165/81; 138/26, 28, 178

[56] References Cited

U.S. PATENT DOCUMENTS

| 2,732,227 | 1/1956 | Kaiser | 285/47 |
| 2,785,536 | 3/1957 | Hinckley | 285/DIG. 5 |
| 3,068,026 | 12/1962 | McKamey | 285/47 |
| 3,095,220 | 6/1963 | Johnston et al. | 285/114 |
| 3,986,341 | 10/1976 | DeHann | 285/DIG. 5 |
| 3,991,588 | 11/1976 | Laskaris | 285/DIG. 5 |

*Primary Examiner*—Werner H. Schroeder
*Assistant Examiner*—Conrad L. Berman
*Attorney, Agent, or Firm*—Kenyon & Kenyon, Reilly, Carr & Chapin

[57] ABSTRACT

An equalizing arrangement for a low temperature line having at least one rigid inner tube used for the conduction of a cryogenic medium which contains at least one tubular compensating element for the equalization of length changes in which an expansion device is associated with the compensating element permitting the length of the compensating element to be preset as a function of the inner tube temperature to prevent forces from acting upon the terminations connected to the low temperature line during a cooling process.

10 Claims, 4 Drawing Figures

EQUALIZING ARRANGEMENT FOR A LOW TEMPERATURE LINE

BACKGROUND OF THE INVENTION

The invention relates to equalizing arrangements for low temperature lines in general and more particualrly to such an arrangement which prevents undesired forces.

Low temperature lines having at least one rigid inner tube which contains at least one tubular compensating element for the equalization of length changes and is enclosed by an outer tube, the lines being used for the conduction of a cryogenic medium, are known. These and other low temperature lines are provided for the transport of gaseous or liquefied cryogenic media whose temperatures are considerably below the ambient temperature of these lines. In general, they contain at least one inner tube through which the cryogenic medium flows and which, therefore, has a temperature level in its operating state which at least approximates that of the cryogenic medium.

Low temperature cables having at least one dc or ac conductor cooled to low temperature and kept at low temperature by a cryogenic medium disposed in an inner tube are special types of low temperature lines. Where superconductive material is provided as the conductor material, the cryogenic medium is perferably helium. It is for this reason that the inner tube of such a cable is also called helium tube.

Such low temperature lines operate with relatively good thermal efficiency if additional measures are taken to limit heat exchange between the cryogenic medium in the inner tube and the outside temperature. In a special embodiment of such a low temperature line, therefore, the inner tube is concentrically enclosed by another tube. This other tube serves as a thermal shield and is also called a radiation shield. The radiation shield may expediently be kept, by another medium such as liquid nitrogen, at a temperature level higher than that of the inner tube. The radiation shield in turn is surrounded by an outer tube insuring the vacuum tightness of the entire low temperature line, this outer tube also acting as protection against mechanical damage to the inner tube and the radiation shield. Between the inner tube, in which are disposed, for example, electric conductors, and the outer tube there may, moreover, be disposed a large number of insulating foil layers to prevent heat transfer between the outer and inner tube. These insulating foil layers are also known as superinsulation. A stable positioning of the tubes enclosing each other is obtained by appropriate mechanical structures which allow simple assembly of these tubes and which keep the heat transfer between the tubes to a minimum.

One difficulty with such lines is that a rigid inner tube opposite a rigid outer tube changes its length when cooled to the operating temperature from the ambient temperature, or when it must be reheated from the operating temperature to the ambient temperature, such as in the case of a malfunction. For, all materials which can be used for the inner tubes to carry cryogenic media such as liquefied or gaseous nitrogen, hydrogen or helium, will shrink considerably when cooled from room temperature to the operating temperature. For example, at a temperature drop from 300 K to 4 K, this shrinkage amounts to 4.2°/$_{oo}$ for aluminum, 2.8°/$_{oo}$ for chrome-nickel steel and 3.2°/$_{oo}$ for copper. Even the shrinkage of special steel alloys, known by the name Invar, which shrink by only about 0.3°/$_{oo}$ for the temperature drop mentioned, cannot be neglected when long tubular lines are involved. In order to equalize length reductions of these lines it is generally necessary, therefore, to insert appropriate compensation elements such as sections of corrugated tubing in the inner tubes.

An appropriate embodiment of a low temperature line in which both the outer tube and the inner tube, in which conductor wires cooled to low temperature may be disposed, for example, are or rigid design, is described in the journal "Naturwissenschaften" 57 (1970), pages 414 to 422 in particular page 420, FIG. 7b.

The inner tube contains a compensating element in the form of a corrugated tube, by means of which shrinkage differences between the inner and outer tube, occurring when the inner tube is cooled to the operating temperature of the cryogenic medium flowing in it, can be equalized. Moreover, a radiation shield is disposed between the inner and the outer tube. This radiation shield is provided with cooling tubes in which another coolant may flow and which contain corresponding compensation elements for the equalization of shrinkage differences.

In order to keep the heat input into the cryogenic media carried by such low temperature lines as small as possible, a high vacuum is provided between the outer and the inner tube, and superinsulation and radiation shields are generally disposed between these tubes. In addition, it is necessary to fix the inner tube inside the outer tube so as to be as free of forces as possible in order to be able to design support or suspension devices of small cross-sectional area for the inner tube. It is then possible to keep the introduction of heat through these devices correspondingly low.

However, a study of the function of the cooling circuits for such low temperature lines during a cooling process, during operation or while their inner tubes are warming up will reveal that the known corrugated tube compensating elements only imperfectly meet the requirement that the inner tubes be held inside the outer tubes without stress. For example, in order to cool an inner tube continuously from room temperature to the intended operating temperature by means of a cooling gas such as helium, a considerable pressure such as of 10 to 15 bar is required because of the relatively low heat capacity of the gas. The tube diameter of inner tubes which may be intended to accommodate superconducting phase conductors of a superconducting cable are as large as 120 mm or even larger, for example. If a corrugated tube is now inserted in such an inner tube, it will be pushed apart with a corresponding, considerable force which may be as great as 1.1 to 1.7 tons. But the elastic force of a corrugated tube beyond its unstressed position is generally only 100 to 120 kg. Therefore, it is well below that sufficient to counteract the force acting on the corrugated tube. In order to not overstress the corrugated tube, it must, therefore generally be provided with a travel limiting device.

At the start of a cooling process of such a low temperature line whose inner tube is still warm, a corrugated tube inserted into the inner tube will therefore be expanded, due to the internal pressure, to its maximum length predetermined by the travel limiting device. The stretched inner tube is then too long by an amount equal to the travel of the corrugated tube. If, for example, the terminations of such a low temperature line are disposed perpendicular to the longitudinal direction of the line, the flanges at the terminations and at the required elbows are stressed in shear. If, on the other hand, the terminations are in the continuation of the straight inner tube, the corrugated tube will be compressed, but the terminations will be acted upon by the force mentioned.

Similar conditions prevail if a boiling cryogenic medium is immediately admitted to an inner tube of the low temperature line. The cryogenic medium then enters the inner tube, which is still at room temperature, at one end of the low temperature line. It is evaporated immediately and heated to room temperature after a short transition zone. In this process, a pressure of several bar is generated which exerts a force on the corrugated tube in the manner already described. Therefore, the corrugated tube is pushed apart while almost the entire length of the inner tube is still at room temperature. The same stresses will then occur at the terminations.

The forces occurring during the cooling processes described above dissipate only gradually with dropping inner tube temperature and disappear only when the operating temperature has been attained over the entire length of the inner tube. This means that the corrugated tube inserted in the inner tube is actually ineffective because it is constantly in its limit position determined by the travel limiting device. It behavior during a cooling process is approximately that of a smooth, rigid piece of tubing.

SUMMARY OF THE INVENTION

Accordingly, it is an object of the present invention to create, for the above described low temperature line containing a length compensating element, an equalizing arrangement in which the difficulties described above are either completely avoided or at least greatly minimized.

According to the present invention, this problem is solved, for an equalizing arrangement of the type mentioned above, by associating an expansion device, which permits the length of the compensating element to be preset as a function of the inner tube temperature, with the compensating element.

The compensating element such as a piece of corrugated tubing, inserted into the inner tube of a low temperature line, is compressed by a predeterminable amount at room temperature, i.e., when the inner tube is still warm, and its expansion is released only to the extent that the inner tube is shortened due to shrinkage during a cooling process. Loads on supports and suspensions between the inner and outer tube and on terminations associated with the line are advantageously avoided by these measures. Thus, an unstressed connection of the inner tubes to terminations is obtainable because the length of the inner tube including the compensating element can be kept constant over the entire temperature range of the low temperature line.

To vary the length of the compensating element, the expansion device is provided in one embodiment with spindles, operable mechanically by hand or by means of a motor, as a function of the instanteous temperature of the inner tube or of a force acting upon the inner tube in lengthwise direction of the line due to temperature changes.

According to another particularly advantageous embodiment of the equalizing arrangement according to the invention, the expansion device contains at least one first, rigid component of an axial length predetermined at room temperature and of predetermined coefficient of expansion, and parallel thereto, at least one other component whose axial length at room temperature is shorter by the amount of the length of the compensating element and whose coefficient of expansion is greater than that of the first component. The components may, in particular, be concentric pieces of tubing rigidly joined to each other at one end while their other ends are each rigidly connected to a section of inner tubing which is attached to the compensating element. The lengths and coefficients of expansion of the components are advantageously selected so that the length of the compensating element is increased by the amount by which the inner tube shrinks in the cooling process as a function of temperature. This system is practically an automatic control and requires no separate mechanical actuating devices.

Moreover, the expansion device used as a compensating element, may advantageously be used at the same time for carrying the cryogenic medium between the individual sections of the inner tube. This embodiment of an equalizing arrangement is characterized by a particularly simple design because it makes it possible to obviate expandable parts such as sections of corrugated tubing.

DETAILED DESCRIPTION OF THE INVENTION

Figure 1:
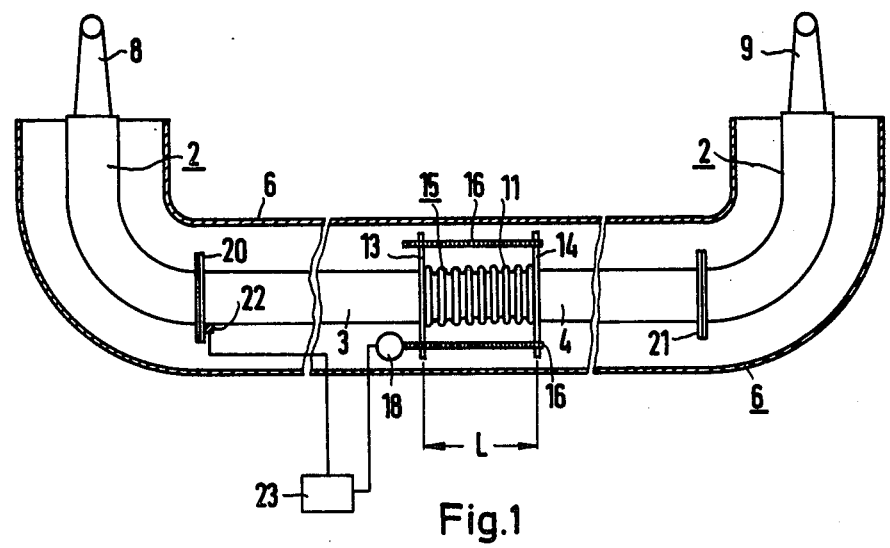
FIG. 1 is a longitudinal cross sectional view of a first embodiment of an equalizing arrangement according to the present invention.

In FIG. 1 a partial longitudinal section of a low temperature line with an equalizing arrangement according to the present invention is shown. The low temperature line contains a rigid inner tube 2 which is divided into at least two individual sections 3 and 4, and is concentrically enclosed by a rigid outer tube 6. The inner tube 2 carries a cryogenic medium such as liquid helium or liquid hydrogen which may be provided to cool conductors such as superconductors, not shown in the figure. Therefore, the inner tube 2 has at least approximately the temperature level of the cryogenic medium. This medium and, if applicable, the electric current for the conductors are fed into the line at one end by means of a termination 8, not detailed in the figure, and discharged at the other end of the line through a corresponding termination 9. A high vacuum may expediently be provided between the inner tube 2 and the outer tube 6, as may if applicable, at least one radiation shield and superinsulation, in order to limit the heat transfer losses from the outer tube to the inner tube. Also required within the outer tube are support or suspension devices, not shown in the figure, in order to fix the inner tube and, if applicable, a radiation shield.

For the equalization of length variations a compensating element expandable in the lengthwise direction of the line, such as a section of corrugated tubing 11 is inserted between the two individual sections 3 and 4 of the inner tube 2. This section of corrugated tubing may be joined to the individual sections 3 and 4 by means of flanges, for example, or it may be welded to them. A fastening element such as rings 13 and 14 extending radially outward relative to the axis of the line, is rigidly attached to the outsides of the ends of the individual sections 3 and 4 which are joined to the piece of corrugated tubing 11. These rings may, for example, also act as connecting flanges between the section of corrugated tubing 11 and the individual sections 3 and 4 of the inner tube 2. Between the rings an expansion device 15, is provided by means of which the length L of the piece of corrugated tubing 11 can be preset. In essence, this expansion device consists of threaded spindles 16 passing through the rings 13 and 14. The spindles may be movable, for instance, manually from the outside or by a servo motor 18.

On the inner tube 2, for instance on a flange 20 or 21, where two sections of the inner tube are joined together, there is disposed at least one sensor 22, by means of which the contraction and expansion forces occurring between the tube sections in the lengthwise direction of the line during temperature variations can be measured. Strain gage foils or load cells, for instance may be used as sensors 22. Depending on the forces occurring, the sensors 22 transmits a signal to a control amplifier 23 which provides an output to drive the servo motor 18 until the length L of the piece of corrugated tubing 11 is changed by the associated spindles 16 so that an unstressed connection of the inner tube sections is obtained at the flanges. It is thus possible to keep the entire length of the inner tube 2 and of the section of corrugated tubing 11 constant over the full temperature range and therefore even during during a cooling process, so that virtually no forces are exerted on the terminations 8 and 9 by the inner tube 2.

Figure 2:
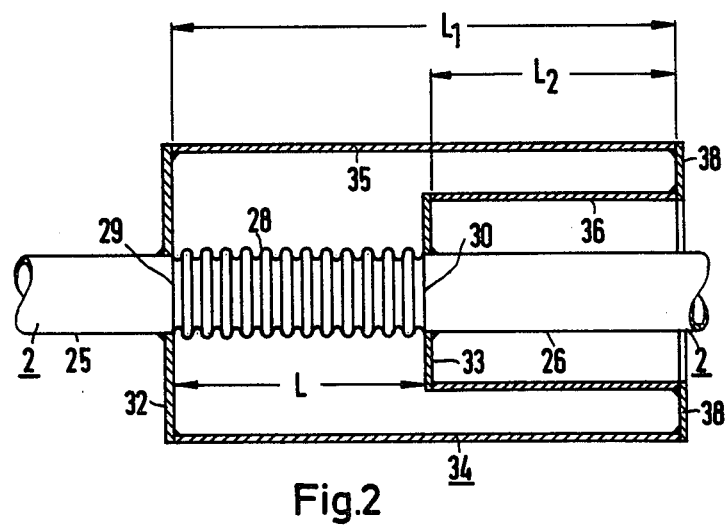
FIGS. 2 to 4 are similar views of additional embodiments of the equalizing arrangement of the present invention.

In FIG. 2, another embodiment of an equalizing arrangement for a rigid inner tube 2 of a low temperature line is shown schematically in a longitudinal section. The other details not shown in FIG. 2 may, for example, correspond to those of the low temperature line of FIG. 1. The equalizing arrangement is disposed between two individual sections 35 and 26 of the inner tube 2 and contains sections of corrugated tubing 28 as the length compensating element. At the ends 29 and 30 of the sections 25 and 26 of the inner tube 2, which ends face the section of corrugated tubing 28, rings 32 and 33 are rigidly joined to their outsides such as by welding. These rings are disposed in radial planes relative to the axis of the line, and they are of different outside diameter. Disposed between the rings is an expansion device 34 containing two tubular components 35 and 36. The face of the one section of tubing 35 of the expansion device is joined to the larger ring 32 fastened to the end 29 of the inner tube section 25. It encloses concentrically the piece of corrugated tubing 28 and a part of the inner tube section 26. Its axial length at room temperature is designated $L_1$. Fastened to the ring 33 of small outside diameter is, correspondingly, the second section of tubing 36 of the expansion device 34, which is disposed concentrically between the inner tube section 26 and the first section of tubing 35 and which is enclosing said inner tube section 26 for a length $L_2$ at room temperature. The length $L_2$ of the section of tubing 36 attached to the ring 33 is chosen so that its lateral face, facing away from the ring 33, lies in a common radial plane with the corresponding face of the section of tubing 35. Both faces are connected to each other via a ring 38 such as by being welded to this ring. Thus, the length difference $L_1 - L_2$ of the two sections of tubing 35 and 36 of the expansion device 34 determines the length L of the section of corrugated tubing 28.

The section of tubing 35 having the length $L_1$, of the expansion device 34 is made of a material which shrinks only relatively little when cooled from room temperature to a low operating temperature. For example, a special ceramic may be used as the material for this component. On the other hand, the shorter section of tubing 36 of the length $L_2$ is made of a material which shrinks as much as possible in the desired temperature range. This section of tubing may consist, for example, of high density polyethylene which shrinks about 2.9% for a temperature drop from 300 K to 4 K. If aluminum is provided for this section of tubing 36, the resultant shrinkage for the same temperature drop is approximately 4.2°/$_{oo}$.

At room temperature, the lengths $L_1$ and $L_2$ of the sections of tubing 35 and 36, respectively, are chosen so that the section of corrugated tubing 28 is compressed to a predetermined length L. If the inner tube 2 is now cooled, the sections of tubing 35 and 36 will also assume the inner tube temperature due to heat conduction. Therefore, the ring shaped fastening means 32 and 33 are expediently made of a highly heat conducting material. Whereas the length $L_1$ of the section of tubing 35 remains almost unchanged during a cooling process the section of tubing 36 shrinks as a function of the temperature decrease and thus allows the section of corrugated tubing 28 to expand. The length dimensions $L_1$ and $L_2$ of the sections of tubing 35 and 36 are chosen so that their shrinkage corresponds at least approximately to the amount of shrinkage of the inner tube sections 25 and 26 connected to the piece of corrugated tubing 28. Where the section of tubing 36 has a relatively small coefficient of expansion, the lengths $L_1$ and $L_2$ of the two sections of tubing 35 and 36 should be increased accordingly.

For example, assume a total length of 35 m for the inner tube sections 25 and 26. If these inner tube sections consist of a special nickel-iron alloy known by the name Invar, and if they are cooled from 300 to 4K, they will shrink 0.035°/$_{oo}$, i.e., by approximately 12.25 mm. Now, if the longer section of tubing 35 of the expansion device is likewise made of this special alloy while high density polyethylene having a shrinkage of approximately 2.9% for the given temperature range is selected as the material for the shorter piece of tubing 36, then at room temperature, the length $L_1$ of the section of tubing 35 must be 48 cm and the length $L_2$ of the section of tubing 36 must be 42.8 cm.

If the aluminum is used for the section of tubing 36, the resulting corresponding tube lengths are considerably greater. At an original length L of the piece of corrugated tubing 28 of 6 cm, the section of tubing 35 must then be 3.18 m long, assuming that the shrinkage of this material is 4.2°/$_{oo}$ for the given temperature drop.

Figure 3:
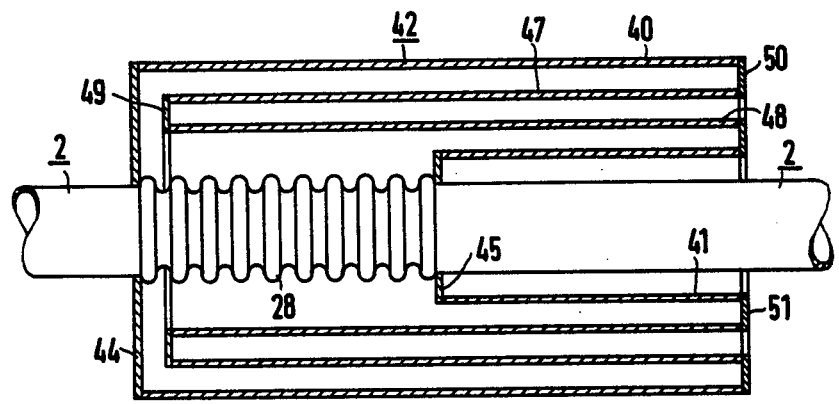

If, for design reasons, such a great length of the two sections of tubing of the expansion device according to FIG. 2 cannot be provided, these sections of tubing may be divided into at least two concentric tube lengths as illustrated by FIG. 3. In the embodiment of an equalizing arrangement according to the present invention as shown on FIG. 3, two tubular components 40 and 41 of the expansion device 42 are attached to annular plates 44 and 45 in the same manner as in the embodiment per FIG. 2.

However, the faces of these tubular components 40 and 41 opposite the annular plates are not connected to each other directly by means of another annular plate, but rather via two other tubular components 47 and 48. These tubular components, which are of the same axial length but of different diameter, are disposed concentrically to the axis of the line between the tubular components 40 and 41. At one end they are rigidly joined to each other by means of an annular plate 49. The other lateral end of the tubular component 47, having the larger diameter, is fastened, together with the corresponding end of the tubular component 40, to an annular plate 50, whereas the tubular component 48 of the smaller diameter is connected to the tubular component 41 in corresponding manner via an annular plate 51. In the longitudinal cross section of the expansion device 42, a meander arrangement of the tubular sections 40, 47, 48 and 41 is thus obtained.

It is advantageous to provide the material of the innermost tubular component 41 as the material for the component 47 which encloses the component 48, whereas the component 48 consists of the material of the outermost tubular component 40. Thus, the four tubular components 40, 47, 48 and 41, when viewed from the outside towards the inside, alternate in the magnitude of their coefficient of expansion.

Figure 4:
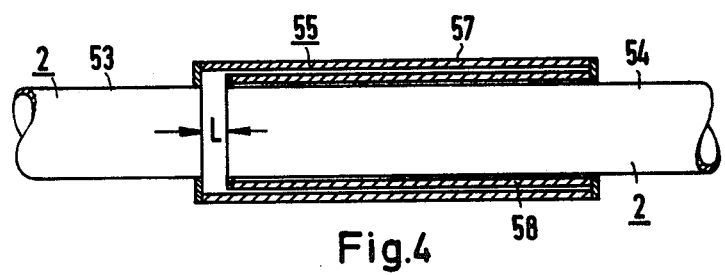

If the individual components of the expansion device 34 of FIG. 2, or 42 of FIG. 3, are connected to each other and to the inner tube sections associated with them in such a manner that they define a chamber which is tight for the cryogenic material, the section of corrugated tubing between the two inner tube sections having the reference symbols 53 and 54 can be eliminated as illustrated by the equalizing arrangement of FIG. 4. The length compensating element of this equalizing arrangement whose length L at room temperature can thus be predetermined as desired and can be very short for example, is practically formed only by its expansion device 55. This device, conforming to the embodiment of FIG. 2, contains two tubular components 57 and 58, one enclosing the other concentrically. These components may rest directly on each other or be radially spaced from each other slightly, as shown in the figure.

Since the temperature dependent shape of the curves of the coefficients of expansion of the materials provided for the tubular components of the expansion devices of FIGS. 2 to 4 are approximately the same in first approximation, the slight differences in the shrinkage of these materials need not be taken into consideration.

For the actual design of the expandable parts between the individual inner tube sections, simple sections of corrugated tubing may be used because their axial guidance and limitation is assumed in the above described manner by the expansion device according to the invention.

It is also possible to use several rod-shaped elements having appropriate coefficients of expansion in place of the tubular components provided in FIGS. 2 and 3.

The premise in the embodiments illustrated is that only one equalizing arrangement is provided between two individual sections of an inner tube. But such equalizing arrangements may also be disposed at the beginning or end of a low temperature line. In addition, for reasons of guiding and limiting the compensating elements, it is generally expedient to insert a greater number of appropriate elements of shorter length in an inner tube instead of only one element of long length. This applies particularly to the cooling of lines with boiling media, in order to achieve good temperature equalization at the respectively associated inner tube section.

In an application where rigid tubes are also used for a radiation shield in a low temperature line, appropriate equalization arrangements according to the present invention can be provided for the equalization of shrinkage differences.

We claim:

1. An equalizing arrangement for a low temperature line having at least one rigid inner tube enclosed by an outer tube, the inner tube being used for the conduction of a cryogenic medium comprising:
   a. a compensating element forming part of the inner tube and connecting two sections thereof; and
   b. an expansion device associated with the compensating element, said expansion device rigidly coupling the two tube sections which are connected by said compensating element, the expansion device being such that it establishes a predetermined length for every given temperature between normal ambient temperature and the temperature of the cryogenic medium conducted by said inner tube.

2. Apparatus according to claim 1 wherein said compensating element comprises a part expandable in the lengthwise direction of the line.

3. Apparatus according to claim 2 wherein said expandable part comprises a section of corrugated tubing.

4. Apparatus according to claim 2 wherein said expansion device includes a plurality of spindles coupled to said expandable part to change the length of said expandable part.

5. Apparatus according to claim 4 wherein said expansion device further includes means to operate said spindles as a function of a force acting upon the inner tube in the lengthwise direction of the line.

6. Apparatus according to claim 5 wherein said means to operate include a measuring means selected from the group consisting of strain gages and load cells attached to the inner tube to measure said force.

7. Apparatus according to claim 1 wherein said expansion device comprises at least one first rigid component of predetermined axial length at room temperature and predetermined coefficient of expansion, and parallel thereto at least one second component whose axial length at room temperature is shorter by the length of the compensating element and whose coefficient of expansion is greater than that of the first component.

8. Apparatus according to claim 7 wherein the one ends of said first and second components are rigidly connected to each other and their other ends respectively to the ends of the individual sections of the inner tube connected to the compensating element.

9. Apparatus according to claim 7 wherein said first and second components are concentric pieces of tubing.

10. Apparatus according to claim 9 wherein said expansion device also acts as the compensating element and is disposed to carry the cryogenic medium between the individual sections of the inner tube.

* * * * *